United States Patent
Motoda

(10) Patent No.: US 8,027,418 B2
(45) Date of Patent: Sep. 27, 2011

(54) DIVERSITY RECEPTION CIRCUIT

(75) Inventor: Yuji Motoda, Kanagawa (JP)

(73) Assignee: Renesas Electronics Corporation, Kanagawa (JP)

(*) Notice: Subject to any disclaimer, the term of this patent is extended or adjusted under 35 U.S.C. 154(b) by 781 days.

(21) Appl. No.: 11/518,875

(22) Filed: Sep. 12, 2006

(65) Prior Publication Data

US 2007/0071148 A1 Mar. 29, 2007

(30) Foreign Application Priority Data

Sep. 26, 2005 (JP) ................. 2005-277722

(51) Int. Cl.
*H04B 7/10* (2006.01)
*H04L 1/02* (2006.01)

(52) U.S. Cl. ........... 375/347; 370/204; 455/61; 455/93; 455/102; 455/142

(58) Field of Classification Search .................. 375/347; 370/204; 455/61, 93, 102, 142
See application file for complete search history.

(56) References Cited

U.S. PATENT DOCUMENTS

| | | | | |
|---|---|---|---|---|
| 3,665,507 A | * | 5/1972 | Peil | 455/142 |
| 5,483,693 A | * | 1/1996 | Bose et al. | 455/273 |
| 5,517,686 A | * | 5/1996 | Kennedy et al. | 455/273 |
| 5,710,995 A | * | 1/1998 | Akaiwa et al. | 455/277.2 |
| 5,940,029 A | * | 8/1999 | Ninomiya et al. | 342/372 |
| 7,106,809 B2 | * | 9/2006 | Whikehart et al. | 375/316 |
| 7,697,913 B2 | * | 4/2010 | Shatara | 455/296 |
| 2002/0004375 A1 | * | 1/2002 | Spencer et al. | 455/277.1 |
| 2005/0233717 A1 | * | 10/2005 | Iwakuni | 455/133 |
| 2007/0230612 A1 | * | 10/2007 | Ahmed | 375/295 |

FOREIGN PATENT DOCUMENTS

| | | |
|---|---|---|
| JP | A-2-94814 | 4/1990 |
| JP | 5-068146 | 9/1993 |
| JP | A-7-154377 | 6/1995 |
| JP | 7-231682 | 12/1995 |
| JP | 9-102764 | 4/1997 |

OTHER PUBLICATIONS

Japanese Patent Office issued a Japanese Office Action dated Jul. 21, 2009, Application No. 2005-277722.

* cited by examiner

*Primary Examiner* — Shuwang Liu
*Assistant Examiner* — Sung Ahn
(74) *Attorney, Agent, or Firm* — Young & Thompson

(57) ABSTRACT

To improve an S/N of an AM signal in a diversity reception circuit while suppressing an increase in a circuit size of A/D conversion circuits therein. In the diversity reception circuit, a single AM signal is supplied to each of the A/D conversion circuits provided for A/D converting a plurality of FM signals, and a plurality of obtained results of the conversions are added by an adding circuit, thereby improving the S/N.

22 Claims, 5 Drawing Sheets

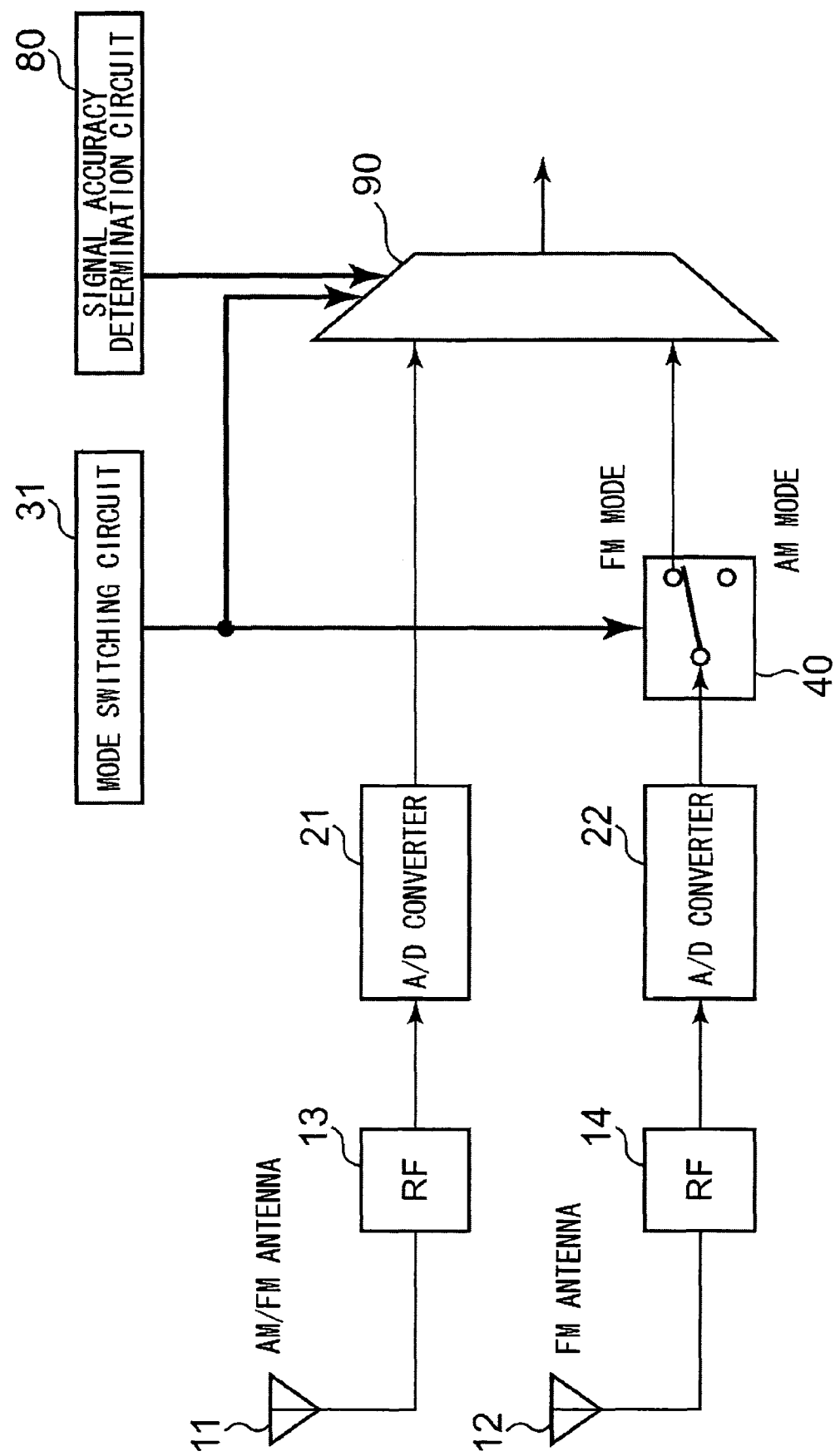

DIVERSITY RECEPTION CIRCUIT

FIELD OF THE INVENTION

The present invention relates to a diversity reception circuit. More specifically, the invention relates to a diversity reception circuit having a plurality of A/D conversion circuits.

BACKGROUND OF THE INVENTION

In recent years, a diversity reception technique, which is a method of receiving electric waves by a plurality of antennas, respectively, and selecting an antenna in a best reception state, thereby increasing reception sensitivity, has attracted attention. This technique is used to avoid fading. The fading is a phenomenon in which when an electric wave propagates through a space, the electric wave is strengthened or weakened depending on a location due to interference caused by a reflected wave from a terrain or building. As the frequency of the electric wave is increased, the influence caused by the fading increases (the intensity of the electric wave is increased or decreased in a narrower range). Accordingly, the effect of diversity reception is increased. For this reason, the diversity reception technique is employed in case where an FM broadcast with a high frequency is received by a radio. On this occasion, signals received by the respective antennas are digitized for comparison. A plurality of A/D converters having the same performance thus becomes necessary (refer to Patent Document 1).

There is also a demand to increase conversion accuracy though there is no need to perform multiple receptions. Take, for example, radio reception again. Noise immunity of an AM broadcast is lower than the FM broadcast. In other words, in FM, information is represented by a change in frequency, while in AM, the information is represented by the change in amplitude. When an external noise is included, the amplitude is more influenced by the external noise or the amplitude has a lower noise immunity. Accordingly, a high signal-to-noise (S/N) ratio is required. On the other hand, the frequency of the AM broadcast is low. Thus, the effect obtained by the diversity reception is low, so that only one system of an A/D converter suffices.

SUMMARY OF THE DISCLOSURE

A configuration of a related art as discoursed above will be shown in FIG. 5. This configuration includes an AM/FM antenna 11 for receiving both of AM and FM signals, an RF filter circuit 13 for receiving the received AM or FM signal and filtering the received AM or FM signal, for output, an A/D conversion circuit 21 connected to the RF filter circuit 13, an FM antenna 12 for receiving an FM signal, an RF filter circuit 14 for receiving the received FM signal and filtering the received FM signal, for output, an A/D conversion circuit 22 connected to the RF filter circuit 14, a switching circuit 40 for outputting an output of the A/D conversion circuit 22 only in an FM mode, a mode switching circuit 31 for outputting a signal for controlling two modes constituted from an AM mode and the FM mode, and a selection circuit 90 for selecting an output of the A/D converter 21 in the AM mode and selecting from between an output of the A/D converter 21 and the output of the A/D converter 22 the output with better accuracy in the FM mode based on an output of a signal accuracy determination circuit 80.

Incidentally, a technique of processing a signal using a plurality of A/D converters is described in Patent Document 2, as a related art.
[Patent Document 1]
   Japanese Patent Kokai Publication No. JP-A-7-154377
[Patent Document 2]
   Japanese Patent Kokai Publication No. JP-A-2-94814
The entire disclosures of those documents are incorporated herein by reference thereto.

In the technique described in Patent Document 1, the plurality of signals are digitized. Accordingly, the plurality of A/D converters are present. In Patent Document 1, however, only one A/D converter is used when a single signal is digitized. When accuracy of the one A/D converter is enhanced so as to improve reception sensitivity when the single signal is received, a need for enhancing accuracy of the A/D converter (s) other than the A/D converter for receiving the single signal as well arises so as to maintain balance among the A/D converters used for receiving and comparing the plurality of signals which have been diversity received. For this reason, when the accuracy is to be increased by increasing the accuracies of the A/D converters, proportions of a required circuit size and current consumption with respect to a proportion of accuracy improvement steeply increases.

Further, in the technique disclosed in Patent Document 2 (refer to FIG. 1 thereof), when Y and C signals of SVHS are input, processing by a plurality (two) of A/D converters corresponding to the signals is performed and output as digital data signals, respectively. When a composite (video) signal of VHS is input, the composite signal is input to the plurality of A/D converters and synthesized, for output. The signal input when conversion of the composite (video) signal of the SVHS is performed is completely different from the Y signal and the C signal, and those signals are just processed in parallel. Accordingly, there is no need for equalizing accuracies of a plurality of A/D conversion circuits. Further, this technique is contradictory with the technique premised in the diversity reception circuit for receiving signals from the plurality of antennas and selecting one of the signals with best signal accuracy. Thus there is much desired in the art.

According to an aspect of the present invention, there is provided a diversity reception circuit of the present invention having a function of selecting from among a plurality of input signals one of the input signals with best signal accuracy and outputting the selected signal. The diversity reception circuit comprises:
   a first A/D conversion circuit that receives a first input signal modulated by a first modulation mode or a second input signal modulated by a second modulation mode;
   a second A/D conversion circuit that receives the first input signal or a third input signal modulated by the second modulation mode; and
   an adding circuit that adds outputs of the first and second A/D conversion circuits, for output, when the first input signal is input to the first and second A/D conversion circuits.

According to a second aspect, the first and second A/D conversion circuits are constituted from the A/D conversion circuits having same accuracy.

According to a third aspect, the diversity reception circuit further comprises a phase adjustment circuit that adjusts a phase of the first input signal to be supplied to the first A/D conversion circuit and a phase of the first input signal to be supplied to the second A/D conversion circuit.

According to a fourth aspect, a frequency of the first input signal is lower than a frequency of the second input signal and a frequency of the third input signal, respectively.

According to a fifth aspect, the diversity reception circuit further comprises a selection circuit that selects from between the second and third input signals a signal with a better signal accuracy and outputting the selected signal, when the second input signal is supplied to the first A/D conversion circuit and the third input signal is supplied to the second A/D conversion circuit.

According to a sixth aspect, in the diversity reception circuit according to the fourth aspect, the first input signal is an AM signal, and the second and third input signals are FM signals.

According to a seventh aspect, the diversity reception circuit further comprises first and second FM/AM antennas for supplying the signals to the first A/D conversion circuit and the second A/D conversion circuit, respectively.

According to an eighth aspect, there is provided a diversity reception circuit having a function of selecting from among a plurality of input signals one of the input signals with best signal accuracy and outputting the selected signal; wherein the diversity reception circuit comprises first and second A/D conversion circuits each receives a first input signal modulated by a first modulation mode or a second input signal modulated by a second modulation mode, respectively, and an adding circuit that adds outputs of the first and second A/D conversion circuits, for output, when the first input signal is input to the first and second A/D conversion circuits.

The meritorious effects of the present invention are summarized as follows.

With a characteristic as described above, the S/N of the input signal modulated by the first modulation method can be improved without increasing the circuit size of the A/D conversion circuits in the diversity reception circuit.

BRIEF DESCRIPTION OF THE DRAWINGS

FIG. 5 is a block diagram showing a related art.

PREFERRED EMBODIMENTS OF THE INVENTION

Figure 1:
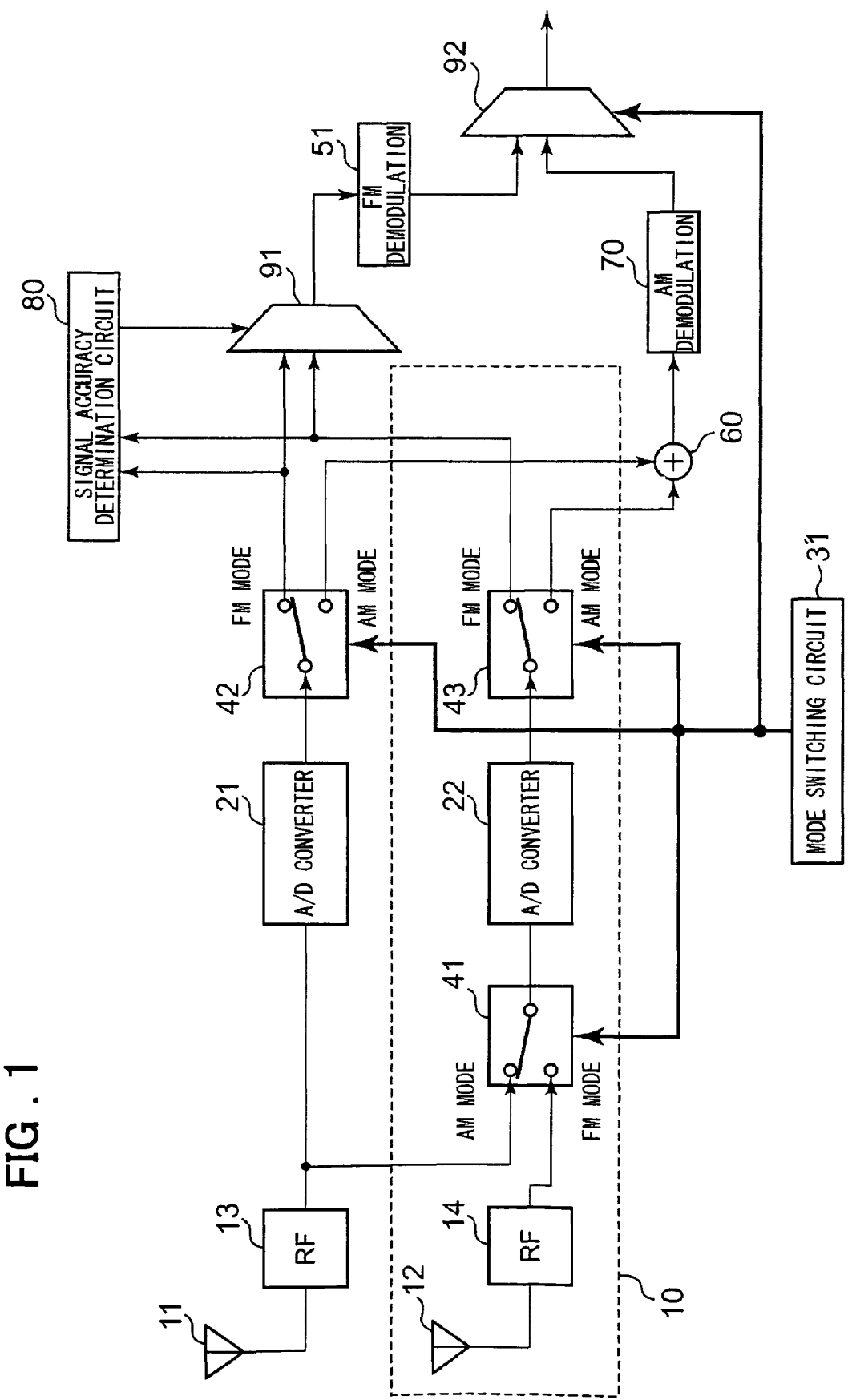
FIG. 1 is a block diagram showing an embodiment of the present invention.

A description about each block of a configuration of the invention shown in FIG. 1 will be given below.

A mode switching circuit 31 generates a mode switching signal for performing mode switching between an FM mode and an AM mode, supplies the mode switching signal to switching circuits 41 through 43 and a selection circuit 92, and controls mode switching of a diversity reception circuit. Each of a first antenna 11 and second antenna 12 receives a radio wave.

An RF filter 13 that receives an output of the first antenna 11 performs filtering for an AM signal or an FM signal according to a mode signal, and performs signal amplification, tuning, and conversion to an IF frequency, for output. Likewise, an RF filter 14 that receives an output of a second antenna 12 receives an FM signal from the second antenna 12 that receives the FM signal, filters the received FM signal, performs signal amplification, tuning, and conversion to the IF frequency, for output.

An A/D conversion circuit 21 A/D converts an output signal from the RF filter 13, for output. An A/D conversion circuit 22 A/D converts an output signal (FM signal) from the RF filter 14 or the output signal (AM signal) from the RF filter 13, for output. Signal supply from the RF filters 13 and 14 to the A/D conversion circuit 22 is controlled by a switching circuit 41 to be controlled by the mode switching signal. In the AM mode, the switching circuit 41 supplies the AM signal from the first antenna 11 to the A/D conversion circuit 22 through the RF filter 13. In the FM mode, the switching circuit 41 supplies the FM signal from the second antenna 12 to the A/D conversion circuit 22 through the RF filter 14.

In the FM mode, a switching circuit 42 supplies an output of the A/D conversion circuit 21 to a selection circuit 91. In the AM mode, the switching circuit 42 supplies the output of the A/D conversion circuit 21 to an adding (adder) circuit 60. In the FM mode, a switching circuit 43 supplies an output of the A/D conversion circuit 22 to the selection circuit 91. In the AM mode, the switching circuit 43 supplies the output of the A/D conversion circuit 22 to the adding circuit 60.

In the AM mode, the adding circuit 60 adds and synthesizes signals from the A/D conversion circuits 21 and 22 supplied through the switching circuits 42 and 43, respectively, for output.

An AM demodulation circuit 70 demodulates the output signal from the adding circuit 60 (AM signal after the addition and the synthesis), for output.

In the FM mode, from between an output signal of the A/D conversion circuit 21 and an output signal of the A/D conversion circuit 22, the selection circuit 91 selects an output signal determined to have better signal accuracy by a signal accuracy determination circuit 80.

An FM demodulation circuit 51 FM demodulates the output signal (FM signal) received from the selection circuit 91, for output.

In the FM mode, a selection circuit 92 selects an output from the FM demodulation circuit 51, for output. In the AM mode, the selection circuit 92 selects the output signal from the adding circuit 60, for output. Next, operations of the present invention described in FIG. 1 will be described.

First, one of the operations when the mode switching signal has specified the FM mode will be described. To the A/D conversion circuits 21 and 22, the FM signals are supplied from the antennas 11 and 12 through the RF filters 13 and 14, respectively, and the respective FM signals are A/D converted, for output. The signal accuracy determination circuit 80 receives the converted signals from the A/D conversion circuits 21 and 22 and outputs a control signal to the selection circuit 91 so that the signal with a better accuracy is selected. The selection circuit 91 outputs the better one of the outputs of the A/D conversion circuits 21 and 22 to the FM demodulation circuit 51. The selection circuit 92 outputs an FM demodulated signal from the FM demodulation circuit 51 to an output terminal.

Next, the other one of the operations when the mode switching circuit 1 has specified the AM mode will be described.

The A/D conversion circuits 21 and 22 receive the AM signal from the antenna 11 through the RF filter circuits 13, respectively, and supplies the output signals obtained by A/D converting the AM signal from the antenna 11 to the adding circuit 60. The adding circuit 60 adds the converted signals, for supply to the AM demodulation circuit 70. The AM demodulation circuit 70 AM demodulates the resultant signal after the addition, for supply to the selection circuit 92. The selection circuit 92 outputs the AM demodulated signal to the output terminal.

In this case, when the output signal and noise of each of A/D converters is indicated by S and N, respectively, accuracy of the signal in the plurality of modes becomes S/N. In the single mode (or when the number of the A/D converters is set to two), the accuracy of the signal becomes $\sqrt{2}(S/N)$. The accuracy thus becomes $\sqrt{2}$ times. When A/D conversions are performed using both of two AD converters A/D1 and A/D2 having the same performance, respectively, output signal voltages of the A/D converters A/D1 and A/D2 and input converted noise voltages of the A/D converters A/D1 and A/D2 are indicated by S1, S2, N1, and N2, respectively. Since the signals to be input to the A/D converters A/D1 and A/D2, respectively, have the same frequency, the same amplitude, and the same phase, signal components excluding noise components of the A/D converted outputs will also become the same if the performances of the A/D converters are equal. Accordingly, a signal component when the outputs of the two A/D converters are added will become 2S1. On the other hand, when the performances of the A/D converters are equal, a noise wave enters each of the A/D converters at random. Accordingly, intensities of noise waves will become equivalent. However, frequencies and phases of the noise waves will become random. Accordingly, a noise component when the outputs of the two A/D converters are added becomes $\sqrt{(N1^2+N2^2)}$. Since the intensities of noises are equivalent, this formula can be represented by $\sqrt{2}(N1)$. Accordingly, an S/N ratio becomes $2S1/(\sqrt{2}(N1))=\sqrt{2}(S1/N1)$. As described above, without changing accuracies of the A/D converters due to addition of the selection circuits and the adding circuit, the S/N of the AM signal in the diversity reception circuit can be improved.

In the embodiment described above, the configuration including the two A/D conversion circuits will be described. In order to further improve the S/N, three or more pairs of input portions and the A/D converters may be included. A second embodiment described in FIG. 2 will be described below.

First, a difference in a configuration will be described. This embodiment is different in that the one circuit block 10 of a broken line portion in the embodiment in FIG. 1 becomes a plurality of circuit blocks 10 in this embodiment as shown in FIG. 2, in that the number of inputs to a signal accuracy determination circuit and the number of inputs to a selection circuit 93 increase according to the number of the circuit blocks 10, and in that the number of the AM signals to be supplied to an adding circuit increases. Incidentally, since a basic portion is the same, a description thereof will be omitted. Next, an operation will be described.

In the FM mode, three or more FM demodulation circuits are provided, and three or more signals are input to the signal accuracy determination circuit 81. Except for these respects, this embodiment is substantially the same as the embodiment in FIG. 1.

In the AM mode, a single AM signal (a signal 1) is converted by a plurality of A/D converters, and results of the conversion are added by the adding circuit 61. The S/N ratio of an output result thereby becomes $\sqrt{n}(S/N)$, and the accuracy of the output result becomes $\sqrt{n}$ times. That is, assume that when all of the n A/D converters constituted from the A/D converter A/D1 and the A/D converters A/D2 having the same performance are used for the A/D conversions, output signal voltages of the A/D converters are indicated by S1, S2, . . . and Sn, respectively, and input converted noise voltages of the respective A/D converters are indicated by N1, N2, . . . Nn, respectively. As in the first embodiment, a signal component when outputs of the respective A/D converters are added becomes nS1, while a noise component when the outputs of the respective A/D converters are added becomes $\sqrt{(N1^2+N2^2+ \ldots + Nn^2)}$. Since noise intensities of the outputs of the respective A/D converters are the same, this formula can be represented by $\sqrt{n}(N1)$. Accordingly, the S/N ratio becomes $nS1/(\sqrt{n}(N1))=\sqrt{n}(S1/N1)$.

Figure 2:
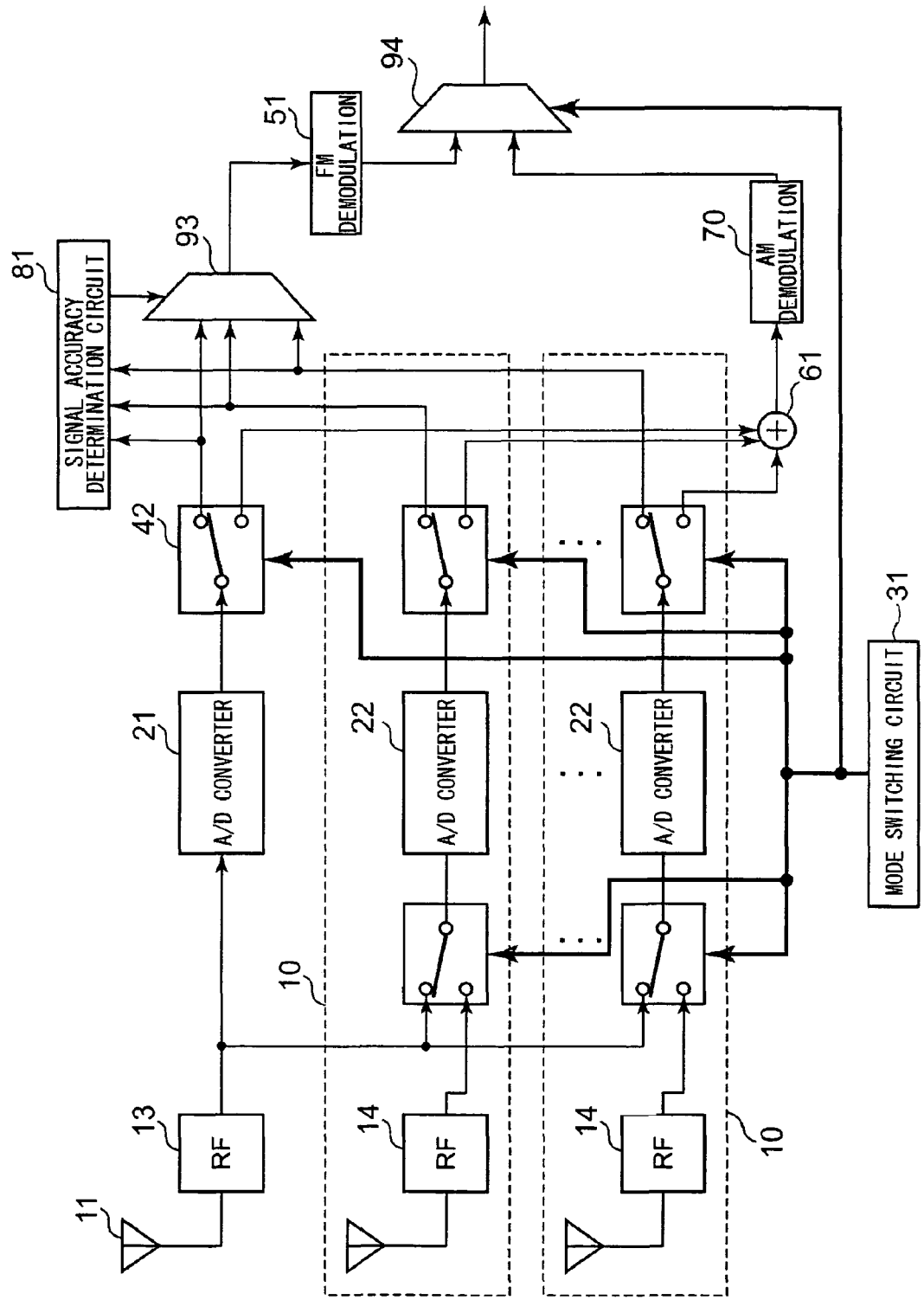
FIG. 2 is a block diagram showing a second embodiment of the present invention.

Referring to FIGS. 1 and 2, unless amplitudes and phases of signals input to the A/D converters are the same in the AM mode, the accuracy will be reduced to the contrary. When the configuration in FIG. 1 is simply mounted, as routes through which the signal 1 enters the A/D converters, there are a route with a selection switch on a way to the A/D converter and a route without the selection switch. A phase error is thereby caused. Accordingly, an adjustment circuit 100 for adjusting phases and amplitudes of the signal 1 becomes necessary.

Figure 3:
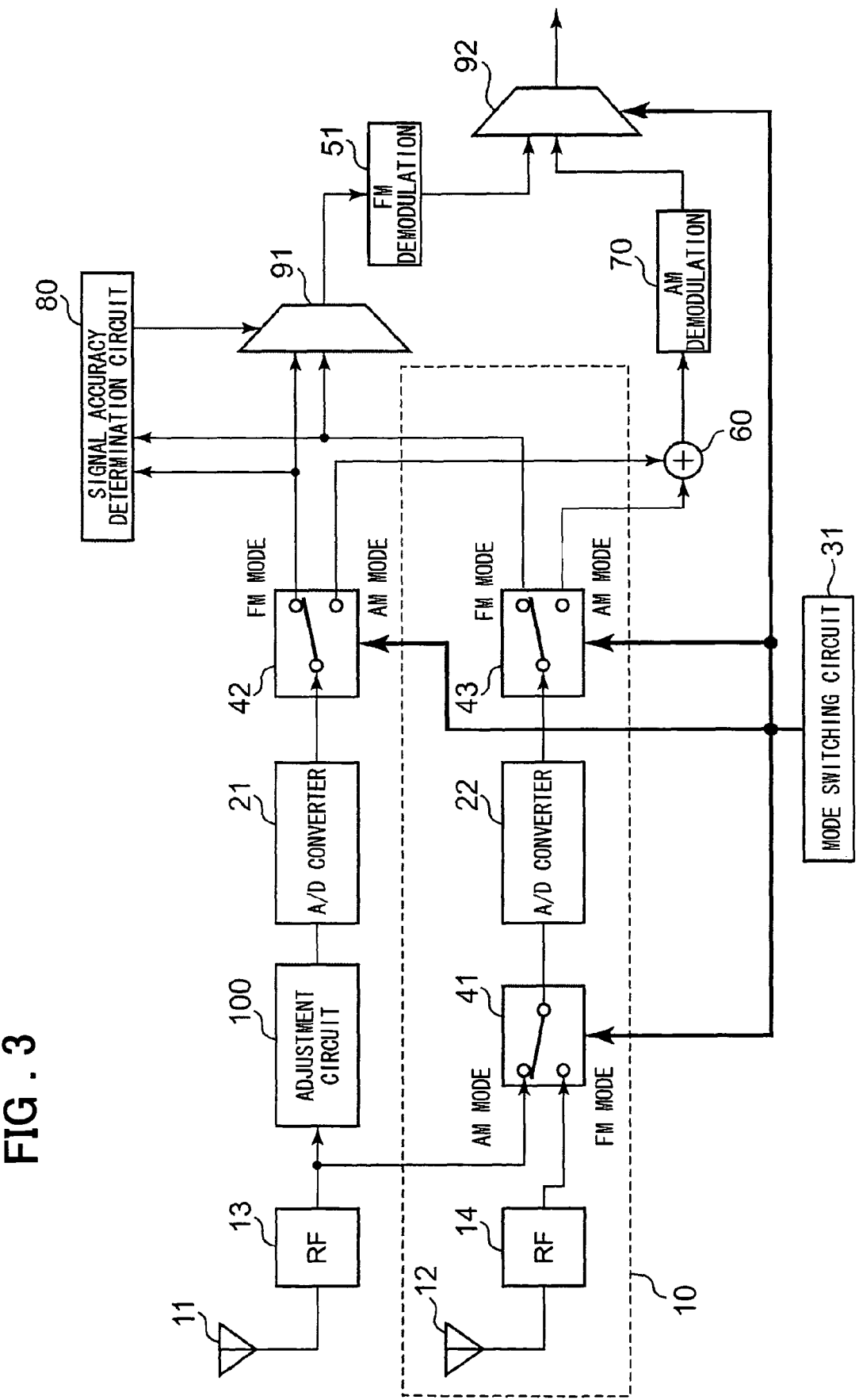
FIG. 3 is a block diagram showing a third embodiment of the present invention.

A third embodiment including this adjustment circuit 100 will be shown in FIG. 3. As such a circuit, wiring with a length thereof adjusted or a dummy switch provided on a route to the A/D1 converter or the like can be conceived. However, any circuit for aligning phases and amplitudes of a plurality of signals to be input to the adding circuit 60 can be employed.

Figure 4:
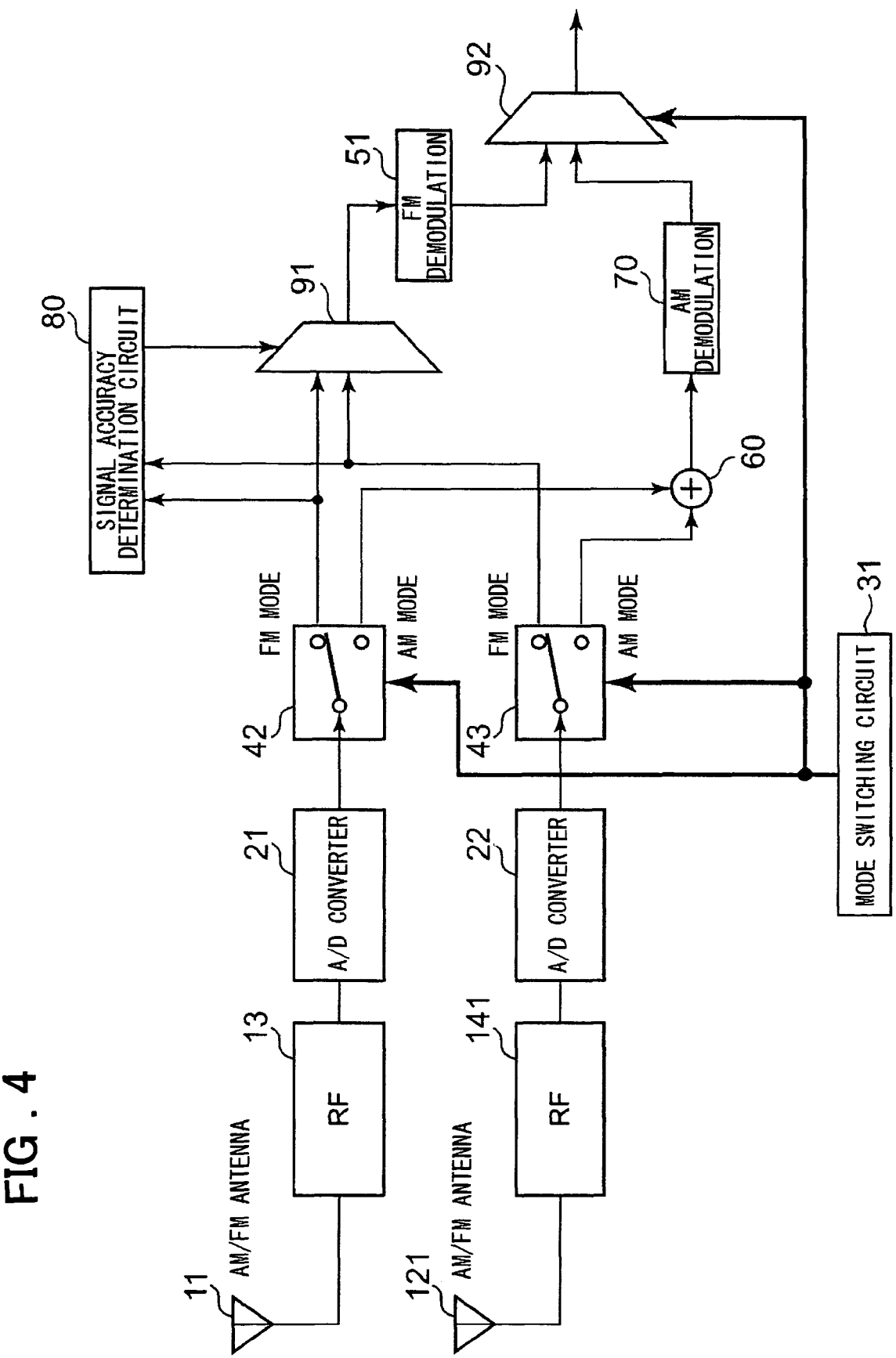
FIG. 4 is a block diagram showing a fourth embodiment of the present invention.

In the embodiment described above, the FM/AM antenna 11 and the FM antenna 12 are provided as the antennas. Thus, when the AM signal is received, the signal from the FM/AM antenna 11 is supplied to the two A/D conversion circuits 21, 22 to improve the S/N ratio of the signal. However, by making the two antennas the FM/AM antennas without using the switch, the S/N ratio can also be improved. A fourth embodiment that implements the above will be shown in FIG. 4.

In the fourth embodiment, an FM/AM antenna 121 is used in place of the FM antenna 12. Then, an FM/AM RF filter 141 is used in place of the RF filter 14 dedicated to FM. Incidentally, since the switch 41 becomes unnecessary, the switch 41 is omitted. Further, blocks that use the same reference numerals are the same as those in the embodiments described above. Thus, descriptions thereof will be omitted.

In this embodiment, the two antennas become the FM/AM antennas. Accordingly, a route from the FM/AM antenna 11 to the adding circuit 60 becomes substantially the same as a route from the FM/AM antenna 121 to the adding circuit 60. Hence, a circuit for phase adjustment becomes unnecessary, or a configuration becomes simple. Phase alignment and amplitude alignment therefore become more facilitated than in the third embodiment.

As described above, a function of converting the single signal with high accuracy and a function of converting the plurality of signals in parallel while suppressing an increase in a circuit size and power consumption can be implemented in the diversity reception circuit.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A diversity reception circuit configured to select one signal from a plurality of input signals as a selected signal having a best signal accuracy and outputting the selected signal, said diversity reception circuit comprising:

a first RF circuit configured to receive one of a first input signal modulated by a first modulation mode and a second input signal modulated by a second modulation mode;

a first analog-to-digital (A/D) conversion circuit configured to receive one of said first input signal and said second input signal as an output from said first RF circuit;

a second RF circuit that is configured to receive one of the first input signal and a third input signal modulated by the second modulation mode;

a second A/D conversion circuit configured to receive one of the first input signal as an output from the first RF circuit and said third input signal as an output from said second RF circuit;

an adding circuit that adds outputs of said first and second A/D conversion circuits, for output, when said first and second A/D conversion circuits both receive said first input signal;

at least one switching circuit; and a mode switching circuit, configured to cause the at least one switching circuit to connect the first RF circuit to both of the first and second A/D conversion circuits in a first switching mode, and configured to cause the at least one switching circuit to connect the second RF circuit to the second A/D conversion circuits in a second switching mode, wherein, in the first switching mode, the first and second RF circuits receive the first input signal modulated by the first modulated mode, and wherein, in the second switching mode, the first RF circuit receives the second input signal modulated by the second modulation mode, and the second RF circuit receives the third input signal modulated by the second modulation mode.

2. The diversity reception circuit according to claim 1, wherein said first and second A/D conversion circuits have same accuracy.

3. The diversity reception circuit according to claim 1, further comprising:

a phase adjustment circuit that adjusts a phase of the first input signal to be supplied to said first A/D conversion circuit and a phase of the first input signal to be supplied to said second A/D conversion circuit.

4. The diversity reception circuit according to claim 1, wherein a frequency of the first input signal is lower than a frequency of the second input signal and a frequency of the third input signal, respectively.

5. The diversity reception circuit according to claim 1, further comprising:

a selection circuit that selects from between the second and third input signals a signal with a better signal accuracy and outputting the selected signal, when the second input signal is supplied to said first A/D conversion circuit and the third input signal is supplied to said second A/D conversion circuit.

6. The diversity reception circuit according to claim 4, wherein the first input signal is an AM signal, and wherein the second input signal and the third input signals are FM signals.

7. The diversity reception circuit according to claim 1, further comprising:

first and second FM/AM antennas for supplying the plurality of input signals to said first RF circuit and the second RF circuit, respectively.

8. A diversity reception circuit configured to select one signal from a plurality of input signals as a selected signal having a best signal accuracy and outputting the selected signal, said diversity reception circuit comprising:

first and second RF circuits each configured to receive input signals modulated by either of a first modulation mode and a second modulation mode;

first and second analog-to-digital (A/D) conversion circuits each configured to receive one of a first output signal or a second output signal from a corresponding one of said first and second RF circuits;

an adding circuit that adds said first and second output signals, for output, when the first output signal from said first RF circuit is input to both of said first and second A/D conversion circuits;

at least one switching circuit; and a mode switching circuit, configured to cause the at least one switching circuit to connect the first RF circuit to both of the first and second A/D conversion circuits in a first switching mode, and configured to cause the at least one switching circuit to connect the second RF circuit to the second A/D conversion circuits in a second switching mode, wherein, in the first switching mode, the input signals received by the first and second RF circuits are modulated by the first modulated mode, and wherein, in the second switching mode, the input signals received by the first and second RF circuits are modulated by the second modulated mode.

9. The diversity reception circuit according to claim 8, wherein said first and second A/D conversion circuits have same accuracy.

10. The diversity reception circuit according to claim 8, further comprising:

a phase adjustment circuit that adjusts a phase of the first output signal supplied to said first A/D conversion circuit and a phase of the first output signal supplied to said second A/D conversion circuit.

11. The diversity reception circuit according to claim 8, wherein a frequency of the received input signals is lower in the first modulation mode than when the input signals are modulated by the second modulation mode.

12. The diversity reception circuit according to claim 8, further comprising:

a selection circuit that selects from between first and second output signals from the first and second conversion circuits a selected signal with a better signal accuracy and outputs the selected signal, when the input signals supplied to said first and second A/D conversion circuits are modulated by the second modulation mode.

13. The diversity reception circuit according to claim 11, wherein the first modulation mode is AM, and the second modulation mode is FM.

14. The diversity reception circuit according to claim 8, further comprising:

first and second FM/AM antennas for supplying the plurality of input signals to said first RF circuit and the second RF circuit, respectively.

15. The diversity reception circuit according to claim 1, further comprising:

a determination circuit configured to determine a signal accuracy of the second and third input signals and output a selected signal based on said determination, wherein said mode switching circuit causes the at least one switching circuit to connect the first and second A/D conversion circuits to the determination circuit in the second switching mode.

16. The diversity reception circuit according to claim 8, further comprising:

a determination circuit configured to determine a signal accuracy of the first and second output signals and to output a selected signal based on said determination, wherein said mode switching circuit causes the at least one switching circuit to connect the first and second A/D conversion circuits to the determination circuit in the second switching mode.

17. A diversity reception circuit receiving first and second input signals through first and second antennas respectively, comprising:
a mode switching circuit configured to generate a modulation mode signal;
a first analog-to-digital (A/D) converter configured to receive the first input signal;
a switching circuit configured to receive the first and second input signals, to output the first input signal in response to the modulation mode signal indicating a first modulation mode, and to output the second input signal in response to the modulation mode signal indicating a second modulation mode;
a second A/D converter configured to receive output of the switching unit; and
an adder which adds outputs of said first and second A/D converters in the first modulation mode.

18. The diversity reception circuit according to claim 17, wherein the first modulation mode is an AM mode and the second modulation mode is a FM mode.

19. The diversity reception circuit according to claim 17, further comprising:
a phase adjustment circuit that adjusts phases of input signals of the first and second A/D converters in the first modulation mode.

20. The diversity reception circuit according to claim 17, wherein the first and second A/D converters have same accuracy.

21. The diversity reception circuit according to claim 17, further comprising:
a selection circuit selecting one of outputs of the first and second A/D converters according to a signal accuracy when the modulation mode signal indicates the second modulation mode.

22. The diversity reception circuit according to claim 17, further comprising:
a first RF circuit coupled between the first antenna and the first A/D converter to generate the first input signal; and
a second RF circuit coupled between the second antenna and the switching unit to generate the second input signal.

* * * * *